March 5, 1963 W. B. WESTCOTT, JR 3,079,764
LIQUID CYCLE REFRIGERATION
Filed July 11, 1958 5 Sheets-Sheet 1

FIG. 1

INVENTOR.
WILLIAM B. WESTCOTT, JR.
BY

ATTORNEY

March 5, 1963 W. B. WESTCOTT, JR 3,079,764
LIQUID CYCLE REFRIGERATION
Filed July 11, 1958 5 Sheets-Sheet 3

INVENTOR.
WILLIAM B. WESTCOTT, JR.
BY
ATTORNEY

March 5, 1963  W. B. WESTCOTT, JR  3,079,764
LIQUID CYCLE REFRIGERATION
Filed July 11, 1958  5 Sheets-Sheet 5

INVENTOR.
WILLIAM B. WESTCOTT, JR.
BY
*ATTORNEY*

United States Patent Office 3,079,764
Patented Mar. 5, 1963

3,079,764
LIQUID CYCLE REFRIGERATION
William B. Westcott, Jr., Cleveland Heights, Ohio, assignor to Cleveland Pneumatic Industries, Inc., Cleveland, Ohio, a corporation of Ohio
Filed July 11, 1958, Ser. No. 747,904
17 Claims. (Cl. 62—118)

This invention relates generally to refrigeration equipment and more particularly to a new and improved refrigerating mechanism and method wherein the refrigerant is maintained in the liquid state throughout the entire cycle of operation.

In the past, it has been customary to utilize refrigeration cycles wherein the refrigerant is in the liquid state in one portion of the cycle and in the gaseous state in the second portion of the cycle. In addition, some refrigeration systems have utilized gas throughout the entire cycle as the refrigerant. Because the past refrigeration equipment has utilized gas in at least portions of the cycle, it is necessary to provide large, cumbersome equipment which has the capacity to handle the large volume of flow of gas. In a refrigerator according to this invention, the refrigerant is maintained in the liquid state throughout the entire cycle. As a result, several advantages are obtained which are not present in the prior art devices. One of the most important of these advantages is derived from the fact that liquid does not expand or contract to a very large degree when it is heated or cooled through the normal operating temperature ranges encountered. Therefore, it is possible to provide a cycle wherein substantially all of the power of compression is returned when the liquid is expanded and only a small amount of additional power is necessary to operate the mechanism. This feature is brought out in more detail below. In addition, liquid has a property, which is not widely recognized, which results, when a liquid is compressed adiabatically by performing a given amount of work, in a temperature increase more than would be derived from a mere conversion of the mechanical work of compression to heat energy applied to the liquid. Stating this in another way, if a liquid is compressed isothermally, that is compressed while maintaining the liquid temperature constant, more heat must be removed from the liquid than the heat equivalent of the work applied in compression. This property of liquids has been known but not widely recognized and it has been customary to assume that liquids behave in the same manner as gases when compressed. In gases, however, if one B.t.u. of work energy is applied to compress the gas, one B.t.u. of heat must be removed to maintain the gas at the same temperature; however, in liquids, if one B.t.u. of work energy is applied to compress the liquid, then it is necessary to remove more than one B.t.u. of heat to maintain the liquid temperature constant. The ratio of this excess heat, that is the amount of heat that must be removed on compression of the liquid to maintain the liquid temperature constant divided by the heat equivalent of the work of compression, is different with different liquids and changes somewhat with pressure and temperature; however, the ratio is always greater than one.

By operating a refrigeration mechanism with a refrigerant in the liquid state, I am able to take advantage of the fact that higher temperature rises are present for a given amount of work of compression because of the excess heat ratio described above and also I am able to operate the system with a relatively small amount of power because almost all of the work of compression is redelivered to the system when the liquid is expanded. The basic cycle in a mechanism according to this invention comprises the steps of compressing a liquid to increase its temperature above the temperature of the sump to which the heat is to be delivered, cooling the liquid while it is under pressure, thereafter expanding the liquid to a temperature lower than the temperature of the area to be cooled and then heating the liquid from this area while the liquid is at low pressure.

It is an important object of this invention to provide a refrigeration system which utilizes a refrigerant maintained in the liquid state throughout the cycle.

It is another object of this invention to provide a refrigeration system which utilizes the compressibility of liquids to obtain elevated temperatures of the liquid.

It is still another object of this invention to provide a refrigeration system wherein a liquid is compressed, cooled, decompressed or expanded and thereafter heated wherein the refrigerant is maintained in a liquid state throughout the entire cycle.

It is still another object of this invention to produce refrigeration by compressing a liquid, cooling the liquid while compressed, thereafter expanding the liquid and then heating the liquid at a relatively low pressure.

It is still another object of this invention to provide a refrigeration system including a compressor capable of compressing and expanding liquids in combination with a first heat exchanger connected to the compressor and capable of cooling liquids at high pressure, and a second heat exchanger connected to the compressor capable of heating liquids at a lower pressure.

Further objects and advantages will appear from the following description and drawings, wherein.

Figure 1:
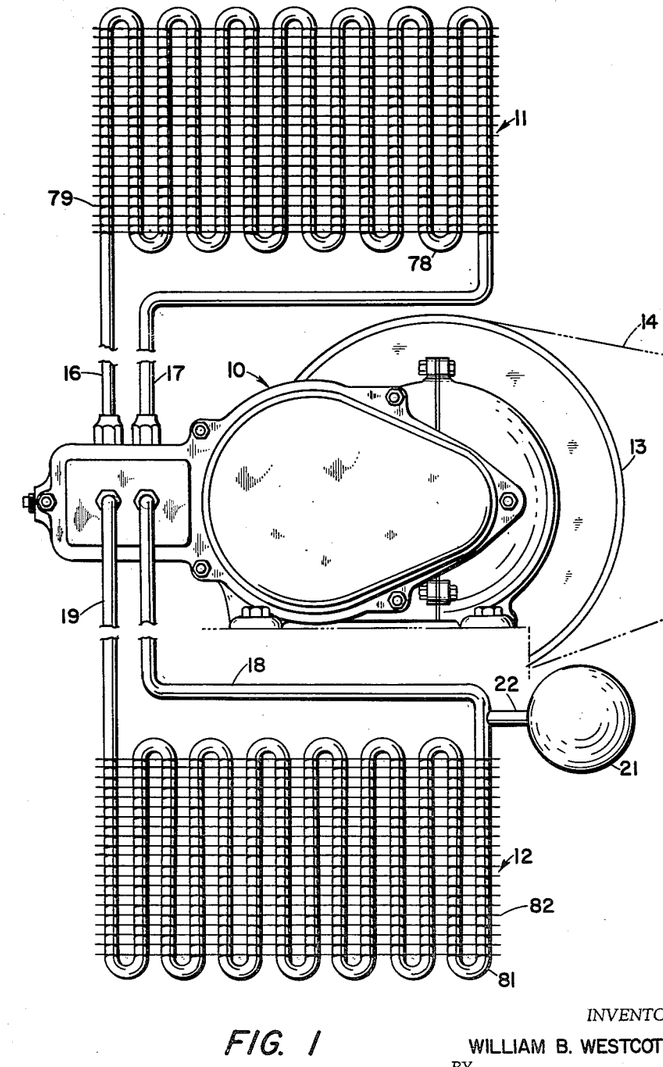
FIGURE 1 is a simplified view of the refrigerating mechanism which operates with a refrigerant maintained in the liquid state throughout the entire cycle.

Referring to FIGURE 1, a refrigeration mechanism according to this invention includes a compressor 10 connected through its high pressure ports to a high pressure heat exchanger 11 and through its low pressure ports to a low pressure heat exchanger 12. The compressor 10 is provided with a flywheel 13 and is adapted to be driven by an external power source such as an electric motor or the like by a drive belt shown in phantom at 14.

The compressor operates to compress liquid and pump the compressed liquid out through a high pressure line 16 to the inlet of the heat exchanger 11 on the compression stroke of the liquid. The temperature of the liquid is elevated by this compression so the heat exchanger 11 operates to cool the liquid while it is maintained at high pressure. Thereafter, the liquid returns to the compressor through a second high pressure line 17 connecting the compressor to the outlet of the high pressure heat exchanger 11. When the cool liquid returns to the compressor 10, it is expanded back to a lower pressure and pumped through a low pressure line 18 to the low pressure heat exchanger 12. The expansion of the cooled liquid still further cools the liquid so that heat can be absorbed thereby as the liquid flows through the heat exchanger 12. The liquid from the heat exchanger 12 is returned to the compressor through a low pressure line 19 after which it is again compressed to repeat the cycle of operation.

It is desirable to maintain the pressure in the low pressure heat exchanger 12 at a relatively low value which can be atmospheric pressure, if desired. However, when a closed system is to be provided, an accumulator 21 is connected to the low pressure portion of the system to prevent excessive pressure fluctuations due to changes in the volume of the liquid in the low pressure circuit. In the illustrated embodiment, the accumulator 21 is connected to the low pressure line 18 by a connecting tube 22.

Referring now to FIGURES 2 through 5c. The compressor includes a housing assembly 23 in which is journalled within adequate bushings 23a a crankshaft 24. Also mounted in the housing assembly 23 is a cylinder pivot pin 26 which projects through a bore 27 formed within the head of a cylinder 28. A pair of opposed bushings 29 support the cylinder pivot pin 26 within the housing assembly 23 and also provide opposed radial walls which engage opposite sides of the cylinder head 28 and prevent axial movement thereof along the cylinder pivot pin 26. Thus, the cylinder 28 is supported in the housing assembly 23 against motion, except rotational motion in a plane perpendicular to the axis of the cylinder pivot pin 26. This motion is shown by the phantom positions in FIGURE 3. A piston 32 extends into a cylinder bore 33 formed in the cylinder 28 and is axially movable relative thereto. Seals 34 are mounted on the piston 32 and provide a sealing engagement between the piston 32 and the cylinder bore 33 so that axial movement of the piston 32 causes a change in displacement of a chamber 36 above the piston 32 within the cylinder 28. The right-hand end of the piston 32 is formed with a journal bearing 37 connecting to an eccentric bearing 38 on the crankshaft 24. Thus, as the crankshaft 24 rotates, the piston 32 reciprocates or strokes in and out of the cylinder 28. To eliminate the usual connecting rod which produces side loads on the piston, the pivotal connection of the cylinder 28 on the pivot pin 26 is utilized. Thus, the cylinder 28 oscillates around the cylinder pivot pin 26 when the crankshaft 24 rotates.

Figure 3:
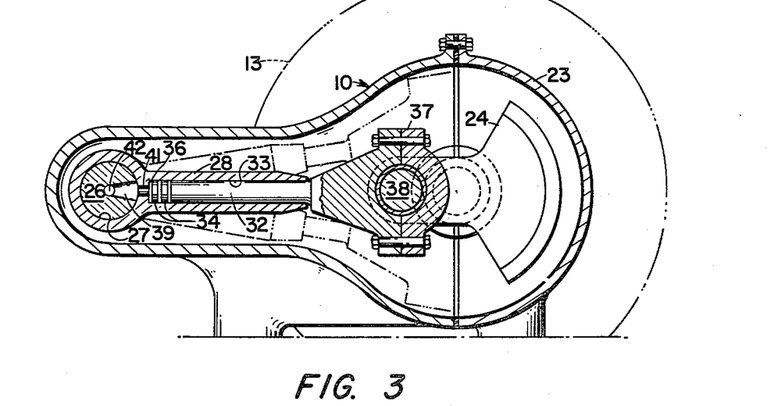
FIGURE 3 is a side elevation partially in section taken along 3—3 of FIGURE 2.

The cylinder pivot pin 26 is formed with a radial passage 39 which is open ot an axial passage 41 formed in the cylinder 28. The radial passage 39 is in turn connected to an axial passage 42 in the cylinder pivot pin 26 so that fluid communication is provided between the end surface 43 of the cylinder pivot pin 26 and the cylinder bore 33 above the piston 32. The radial passage 39 should be enlarged as shown in FIGURE 3 at its outer end so that it maintains communication with the passage 41 in all positions of the cylinder 28 and in effect, provides a swivel connection.

Figure 4:
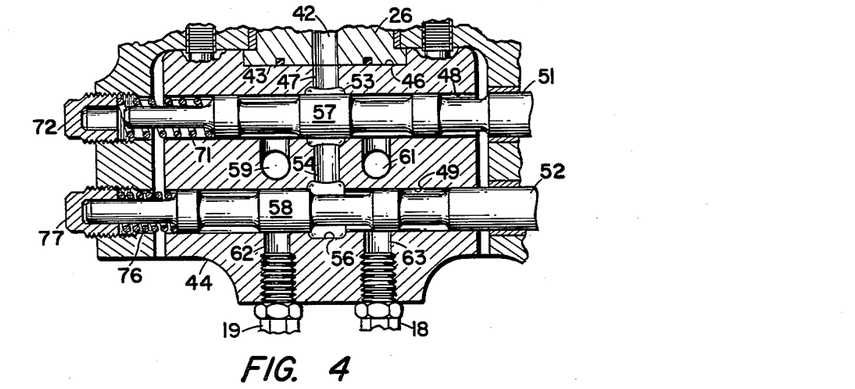
FIGURE 4 is an enlarged fragmentary view of the valve section of the compressor.

Referring to FIGURE 4. A valve block 44 is mounted in the housing assembly 23 and is provided with a side face 46 positioned against the end surface 43 of the cylinder pivot pin 26. A passage 47 is formed in the valve block 44 and communicates with the axial passage 42. The valve block 44 is also formed with a first valve bore 48 and a second valve bore 49 in which are positioned first and second spool valves 51 and 52 respectively. An annular groove 53 within the bore 48 in the valve block 44 communicates with the passage 47 on one side and with a second passage 54 on the other side which in turn communicates with an annular groove 56 within the bore 49. Thus, the cylinder bore 38 is always in communication with the two annular grooves 53 and 56 through the passages 41, 39, 42, 47, and 54. The spool valve 51 is formed with a central land 57 adapted to close the annular groove 53 relative to the valve bore 48 when the valve is in the off position and the spool valve 52 is formed with a central land 58 adapted to close the annular groove 56 when the spool 52 is in its off position. It should be noted that in FIGURE 2, the spool valve 52 has been displaced from the neutral or off position but that the central land 58 is movable to cover the annular groove 56.

Figure 2:
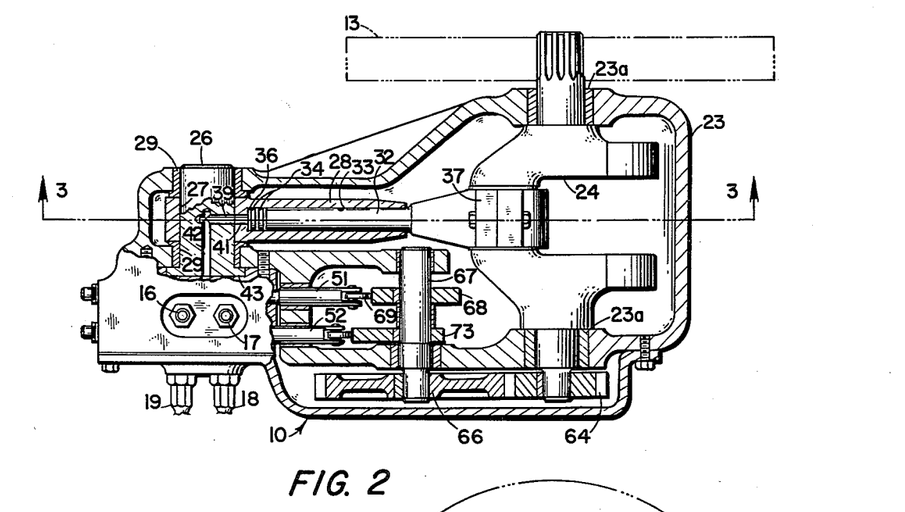
FIGURE 2 is a plan view partially in section showing the structure of the compressor for the refrigeration mechanism.

A pair of ports 59 and 61 connect with the valve bore 48 on either side of the annular groove 53 and in turn to the pressure lines 16 and 17 respectively, shown in FIGURES 1 and 2. Thus, when the spool valve 51 is moved to the left from its central position, the port 61 is connected to the annular groove 53 so the pressure line 17 is connected to the cylinder bore 23. Conversely, if the spool valve 51 is moved to the right from the off position shown, the port 59 and in turn the pressure line 16 is connected to the cylinder bore 33. Two additional ports 62 and 63 are formed in the valve block 44 and communicate with the second valve bore 49 on either side of the annular groove 56 and connect to the low pressure lines 19 and 18 respectively. Thus, when the spool valve 52 is in the position shown in FIGURE 4, the line 18 is in communication with the cylinder bore 33 through the port 63. When the spool valve 52 moves to the position wherein the central land 58 covers the annular groove 56, both of the ports 62 and 63 and their associated lines 19 and 18 are isolated from the cylinder bore 33. Still further movement to the right brings the line 19 into communication with the cylinder bore 33 through the port 62. Therefore, the spool valves 51 and 52 can be selectively operated to provide communication between the cylinder bore 33 and any of the lines 16, 17, 18, or 19.

Referring again to FIGURE 2. Mounted on one end of the crankshaft 24 is a timing gear 64 which intermeshes with a second timing gear 66 mounted on a camshaft 67 journalled in the housing assembly 23. Thus, when the crankshaft 24 rotates the camshaft 67 is in turn rotated with a fixed ratio of angular velocity. In the illustrated invention, the timing gears 64 and 66 are sized so that the camshaft 67 rotates through one revolution every time the crankshaft 24 rotates two revolutions so the timing gears provide a 2:1 gear reduction. A first cam 68 is mounted on the camshaft 67 and is arranged to engage a cam follower 69 on the first spool valve 51. As shown in FIGURE 4, a spring 71 is positioned against the outer end of the spool valve 51 by a cap 72 threaded into the end of the housing assembly 23 to resiliently maintain the cam follower 69 in engagement with the cam 68. Thus, as the camshaft 67 rotates, the cam 68 operates the first spool valve 51. A second cam 73 is mounted on the camshaft 67 and is engaged by a cam follower 74 mounted on the end of the second spool valve 52. Here again, a spring 76 is held against a second spool valve 52 by a cap 77 so that the cam follower 74 is resiliently maintained in engagement with the cam 73.

Referring now to FIGURE 1, the high pressure heat exchanger 11 is formed of reverse loops of tubing 78 on which are secured fins 79. The tubing should be sized so that it will withstand the pressure at which the system operates. Depending upon the full capacity necessary and upon the amount of heat that must be transferred, the heat exchanger 11 may be either a single pass or a multiple parallel pass type. The physical structure of the low pressure heat exchanger 12 is identical to the physical structure of the high pressure heat exchanger 11 and includes reverse loops of tubing 81 and fins 82. In this case, the tubing 81 can have a lighter wall because the pressures encountered are substantially less than the pressures encountered in the high pressure heat exchanger 11. If, however, the system is to be used as a reverse cycle refrigeration system, both heat exchangers must be capable of withstanding the maximum pressure.

Referring now to FIGURES 6a through 6d. The refrigeration system is shown schematically for each stroke of the cycle of operation. In these views, similar numerals are used to indicate the corresponding elements but some parts have been eliminated for purposes of clarity. Because each of the spool valves 51 and 52 operates to change the flow connection in two pressure lines, the spool valve 51 is indicated by two schematic valves shown as short dashes 51a and 51b which are in the lines 16 and 17 respectively. The spool valve 52 is similarly indicated at 52a and 52b in the lines 18 and 19 respectively. These schematic valves cross the associated lines when they are closed and are aligned with the lines when the valves are open for liquid flow. For purpose of this explanation, all the conduits leading to and from the valves are interconnected through a common manifold 9.

Figure 6A:
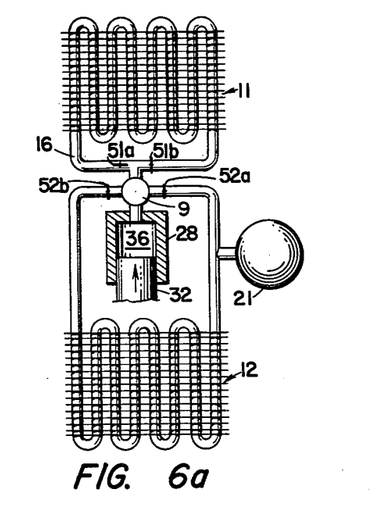
FIGURES 6a through 6d are schematic views of the refrigeration system showing the sequence of operation through one full cycle.

In FIGURE 6a, the piston 32 is moving upwardly relative to the cylinder 28 first compressing the liquid contained within the chamber 36, as supplied thereto at the end of the cycle as hereinafter explained, to a pressure equal to the pressure within the high pressure heat exchanger 11 and thereafter displacing the compressed liquid from the chamber 36 into the heat exchanger 11. The high pressure heat exchanger 11 has a total volume many times as great as the volume of the chamber 36, preferably in the order of 100 or more times the volume of the chamber 36. Therefore, when the piston 32 continues to move upwardly after raising the pressure of the liquid therein, the liquid is displaced from the chamber 36 into the high pressure heat exchanger 11. The liquid passing into the heat exchanger may be considered as a slug or small mass of liquid entering the heat exchanger through the pressure line 16. It displaces the liquid already in the heat exchanger 11 toward the pressure line 17. During this phase of the operation, the valve 51a is open and the valves 51b, 52a, and 52b are all closed so the compressed liquid flows into the heat exchanger 11 through the pressure line 16.

Figure 6B:
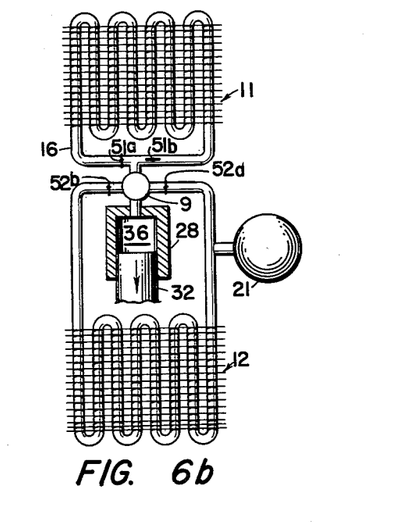

At the completion of the compression stroke of FIGURE 6a, the piston 32 moves downwardly as indicated in FIGURE 6b and the valves are changed so that the valve 51b is open and all of the other valves are closed. Liquid that has been cooled within the heat exchanger 11 flows through the pressure line 17 into the chamber 36 of the compressor. During this stroke, the pressure of the liquid is reduced, expanding the liquid to cool it to a still lower temperature.

Figure 6C:
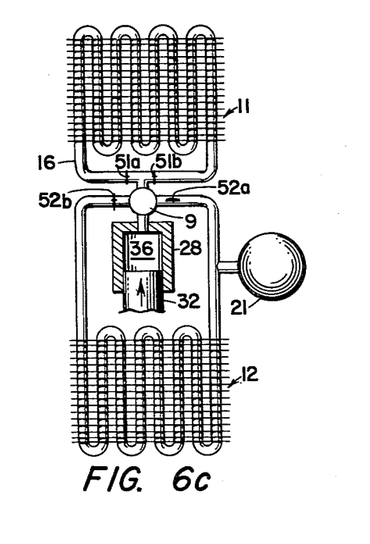
Figure 6D:
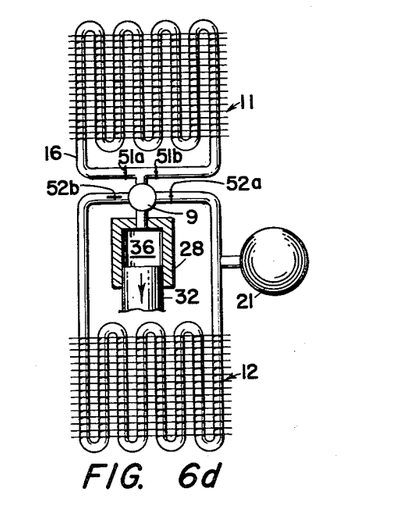

At the completion of the expansion or decompression stroke of FIGURE 6, the piston again moves upwardly as indicated in FIGURE 6c and only the valve 52a is open. Therefore, the cool liquid is displaced out of the chamber 36 into the heat exchanger 12 wherein the temperature of the liquid is increased. On the following outward stroke shown in FIGURE 6d, the valve 52b is opened and the other valves are closed so that liquid flows out of the heat exchanger 12 through the pressure line 19 into the chamber 36. Therefore, the system operates on a four stroke cycle wherein the liquid is compressed in the chamber 36 during the first stroke, expanded in the chamber 36 during the second stroke, displaced into the heat exchanger 12 during the third stroke, and finally returned to the chamber 36 from the heat exchanger 12 during the fourth stroke. It will be recognized that the total volume within the low pressure circuit which includes the low pressure heat exchanger 12 fluctuates since liquid is displaced into this circuit before it is removed therefrom so the accumulator 21 is necessary to prevent large fluctuations in pressure if a closed low pressure circuit is provided. In some cases, the low pressure circuit may be connected to a sump opened to the atmosphere and in these cases, an accumulator need not be provided so long as the sump has sufficient volumetric capacity to adjust for the variations in the volume of the low pressure circuit.

Figure 7:
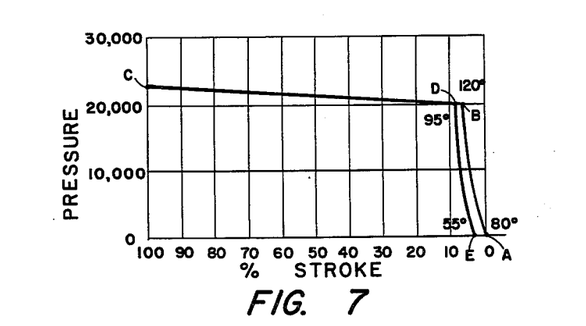
FIGURE 7 is a pressure stroke diagram of the cycle.
Figure 8:
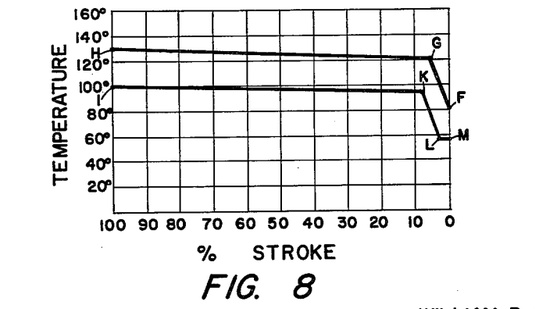
FIGURE 8 is a temperature stroke diagram of the cycle.

Reference should now be made to FIGURES 7 and 8 where a typical cycle is shown. If acetone is used as the refrigerant, adiabatic compression of the acetone from substantially atmospheric pressure to 20,000 p.s.i. will produce a temperature rise in excess of 40° so, if it is assumed that the liquid flowing into the chamber 36 from the low pressure heat exchanger 12 is at a temperature of 80° and atmospheric pressure, the adiabatic compression during the compression stroke to a pressure of 20,000 p.s.i. will produce a temperature of 120° F. This pressure will be reached when the volume of the liquid contained within the chamber 36 is reduced by approximately 5% so the first 5% of the compression stroke elevates the pressure to 20,000 p.s.i. The valve 51a should therefore be arranged to be closed during the first 5% of the piston stroke.

Once the pressure in the chamber 36 reaches 20,000 p.s.i., the valve 51a is opened and the liquid is displaced into the high pressure heat exchanger 11. Because additional liquid is being pumped into the heat exchanger 11 during the remaining 95% of the stroke, the pressure in this heat exchanger will increase depending upon the ratio of the displacement volume of liquid when compared to the total volume of the high pressure heat exchanger and connecting system. For illustration, it can be assumed that the pressure in the heat exchanger 11 and in the chamber 36, due to the displacement of liquid into the high pressure system, will increase to a pressure of about 24,000 p.s.i. Therefore, the temperature of the liquid will rise an additional amount to about 128° or 130° F. The work of compression is represented in FIGURE 7 by the area below the curve ABC.

The liquid contained within the heat exchanger 11 is cooled as it passes through the heat exchanger and for illustrative purposes it can be assumed that the temperature of the liquid is reduced by about 30° to 100° while it is under pressure within the heat exchanger 11. It should be understood that if the volume of the heat exchanger 11 is 100 times as great as the displacement volume of the compressor for a given cycle, a slug or mass of liquid pumped into the heat exchanger on one stroke will not return to the compressor until after 100 cycles. Therefore, the liquid contained within the heat exchanger has sufficient time to be cooled.

After the liquid is cooled, a given mass of liquid is more dense than it is at higher temperatures so the valve 51b should be arranged to cut off the flow from the heat exchanger 11 into the chamber 36 at a point wherein the same mass of liquid is present within the chamber as was displaced from the chamber 36 during the compression stroke so that the pressure within the high pressure heat exchanger 11 will be maintained. The valve 51b is open along the stroke illustrated between the points C and D in FIGURE 7.

When the point D in the stroke is reached, the valve 51b is closed and the liquid contained in the chamber 36 is expanded along the curve DE. The work delivered by the liquid under pressure to the piston 32 during the expansion stroke is represented by the area under the curve CDE and it should be noted that this area is almost equal to the area under the curve ABC so almost all of the work of compression is delivered back to the system during the expansion and the only work that must be supplied is represented by the closed loop ABDE. To provide storage of the energy of expansion so that it will be available for the next compression stroke, the fly wheel 13 is provided.

It is recognized that the liquid contained within the chamber 36 is reduced to substantially zero pressure or atmospheric pressure which, for purpose of analysis, are identical within the pressure ranges involved, before the piston 32 reaches its fully extended position as indicated by the point E so a slight vacuum will be present in the chamber 36 during the approach to the fully extended position of the piston 32. But the pressure change from a low positive pressure to a vacuum is insignificant in the ranges of pressures encountered and it can be considered that the pressure remains constant along the line EA. If acetone is used as the refrigerant, cooling of the liquid from 80° F. to 55° F. in the cycle will cause a reduction in volume or contraction of the liquid equal to about 2% of the initial volume. Therefore, the distance EA is about 2% of the stroke and the distance BD is also about 2% of the stroke.

The expanded liquid in the illustrated case will be at approximately 55° at the end of the expansion stroke when it passes into the low pressure heat exchanger 12. In this heat exchanger, heat is absorbed by the liquid from the zone to be cooled to elevate the temperature of the liquid back to the initial 80° F.

In FIGURE 8, a temperature stroke diagram is shown to illustrate the temperature of the liquid within the chamber 36 during a complete cycle. At the point F, the pressure is substantially zero and the temperature is assumed to be 80°. Compression during the first 5% of the compression stroke raises the temperature of the liquid to the point G wherein its temperature is at least 120°. The additional pressure rise during the displacement of the liquid to the heat exchanger 11 raises the temperature of the liquid still further to the point H at which the temperature is 130° F. The liquid is cooled while under pressure within the heat changer 11 from the point H to the point I at which its temperature is 100°. During the flow of the liquid out of the heat exchanger 11 into the chamber 36, the liquid reduces to a temperature of about 95° F. before the valve 51b is closed. The expansion of the liquid from the point K wherein the valve 51b is closed to the point L reduces the temperature still further to about 55°. Because there is little pressure drop from L to M, the temperature remains constant to the fully extended point illustrated at M. The liquid is then heated within the heat exchanger 12 back to the point F to complete one full cycle.

If the mechanism is used as a standard air-conditioner, the heat exchanger 11 would be located outside and normally be provided with a fan to blow cooling air over it to remove heat from the liquid. The heat exchanger 12 would then be located within the building being cooled and would also be provided with a fan to blow air over it to increase its air cooling capacity. The compressor would then be in any convenient location. Conversely when the system to be used as a heat pump wherein heat is pumped from the ouside into a building or structure the heat exchanger 12 would be outside and the heat exchanger 11 inside the building. Normally if the mechanism is to be of the reversible cycle type which can supply heat or remove heat from a building or structure valving to reverse the compressor 10 connection to the heat exchangers 11 and 12 is provided.

Figure 5A:
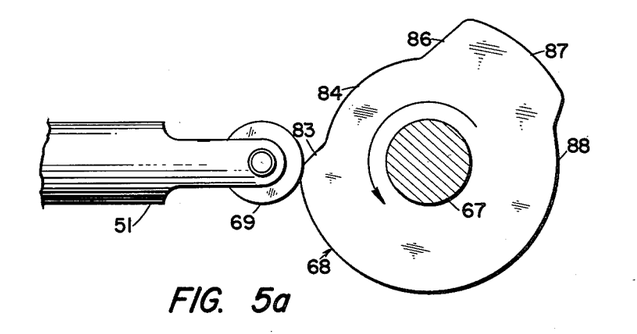
FIGURES 5a and 5b are enlarged fragmentary views of the cams used to operate the valves shown in FIGURE 4.
Figure 5B:
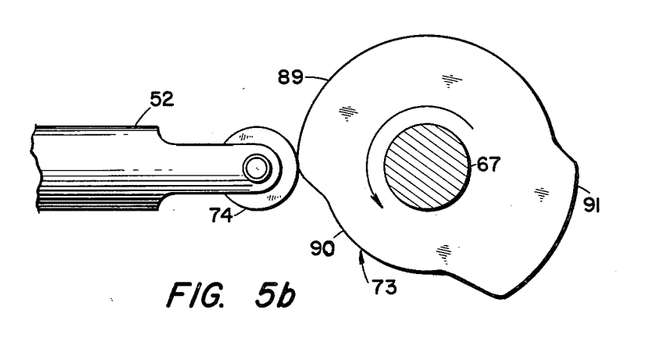
Figure 5C:
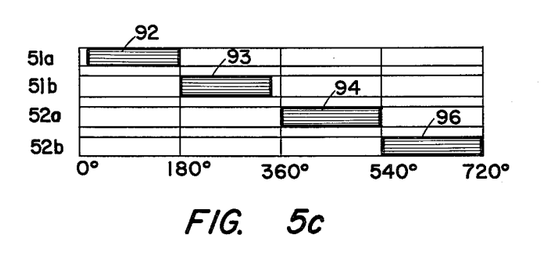
FIGURE 5c is a pictorial representation of the valve operation of the compressor.

Reference should now be made to FIGURES 5a through 5c. At the beginning of the cycle, both of the valves 51 and 52 are in the off position so the cams 68 and 73 are arranged to position the valves in the off position as shown in FIGURES 5a and 5b. When the compressor is moved to a point wherein the liquid has been compressed about 5%, the cam follower 69 will move down a ramp 83 and engage a low portion of the cam 84 which then is in a position under the cam follower. At this time, the spool valve 51 will have moved to the right in FIGURE 4 to provide communication between the chamber 36 and the heat exchanger 11 through the pressure line 16. At the end of the compression stroke, the cam will move to a position wherein the ramp 86 is under the cam follower 69 to shift the spool valve 51 to the left in FIGURE 4 to provide communication between the chamber 36 and the heat exchanger 11 through the pressure line 17 as soon as a high portion 87 is under the cam follower 69. This is the portion of the expansion stroke during which the liquid flows from the heat exchanger 11 to the chamber 36 represented by the line CD in FIGURE 7. At the end of this portion of the expansion stroke, the cam 68 rotates to a position wherein a neutral portion 88 of the cam moves under the cam follower 69 to close the valve 51 and isolate the chamber 36 from both of the heat exchangers that the liquid contained within the chamber can be expanded to low pressure.

During this entire phase of the compressor operation, the cam 73 is rotating under the cam follower 74 with a neutral portion 89 engaged by the cam follower 74. Therefore, the spool valve 52 isolates the low pressure portion of the system from the chamber 36. The cam 73 is proportioned so that a high portion 91 moves under the cam follower 74 at the completion of the expansion stroke to shift the spool valve 52 to the left and provide communication between the chamber 36 and the pressure line 18 for the displacement stroke during which the expanded cool liquid is displaced into the heat exchanger 12. After approximately 180° of crankshaft rotation and 90° of camshaft rotation, a low portion 90 moves under the cam follower 74 causing the spool valve 52 to shift to the right to provide fluid communication between the chamber 36 and the heat exchanger 12 through the pressure line 19.

In FIGURE 5c, a pictorial representation of the valve operation is shown through a full cycle of compressor operation. During the first 5% of the compression stroke, all of the valves are closed indicated by the fact that there are no blocks in this zone to represent open valves. After the first 5% of the compression stroke, the valve 51a is open as represented by the block 92. This valve remains open for the remainder of the compression stroke to the 180° point of crankshaft rotation. After the compression stroke, the valve 51b opens and remains open until a point about 7% ahead of the end of the expansion stroke as indicated by the block 93. The shut off at 7% before the end of the expansion stroke is determined by the fact that the acetone is compressed about 5% and contracts about 2% due to cooling to give a total reduction of volume of 7%. At the completion of the expansion stroke or at 360° of crankshaft rotation, the valve 52a is opened so that the cool and expanded liquid can be displaced into the low pressure heat exchanger 12. This valve can remain open through the full displacement stroke as illustrated by the block 94 since there is no pressure or temperature change involved. After the displacement stroke of the valve 52b is opened as illustrated by the block 96 for the full stroke during which liquid flows back into the chamber 36 through the line 19.

Although acetone has been described as one type of refrigerant and a cycle utilizing pressures in the order 20,000 p.s.i. have been discussed, it should be understood that other liquids could be used as refrigerants and higher pressures can be used in the cycle to meet the particular requirements of the refrigerating system. For instance, if the refrigerating system is to operate an air conditioner, the temperature ranges discussed above will provide adequate performance. However, if larger temperature differentials must be achieved, higher pressure will be used or liquids having greater temperature differentials in response to adiabatic compression will be used. It should also be understood that if desired, it is possible to produce the refrigeration by providing a compression which is at least partially isothermal so that the heat is removed simultaneously with the compressor or the expansion and heating can be at least partly isothermal and still be within the scope of this invention.

It should be recognized that high performance cycles will be produced by a refrigerating system according to this invention because liquids do not expand or contract greatly during heating or cooling and because of this, only a small amount of work need be added to the system through a cycle which work is represented by the closed loop ABDE in FIGURE 7. The size of this loop is determined by the contraction of the liquid during the cooling in the high pressure heat exchanger 11 and the remaining work of compression is returning to the mechanism during the expansion phase of the cycle. Also because liquid is used as the refrigerant, smaller masses of refrigerant are required since liquids tend to have higher coefficients of heat than gases. In addition, the apparatus for producing a given amount of cooling can be much smaller because a given mass of liquid is much smaller than the same mass of gas.

Although a preferred embodiment of this invention is illustrated, it will be realized that various modifications of the structural details may be made without departing from the mode of operation and the essence of the invention. Therefore, except insofar as they are claimed in the appended claims, structural details may be varied widely without modifying the mode of operation. Accordingly, the appended claims and not the aforesaid detailed description are determinative of the scope of the invention.

I claim:

1. A hydraulic refrigeration system completely filled with a compressible fluid comprising a pair of elements movable relative to each other co-operating to define a chamber the volume of which is alternately increased and decreased by relative movement, a first heat exchanger having an inlet and an outlet, a second heat exchanger having an inlet and an outlet; valved means sequentially connecting said chamber to said first heat exchanger inlet when the volume of said chamber is reducing, connecting said first heat exchanger outlet to said chamber when the volume thereof is increasing, connecting said second heat exchanger inlet to said chamber when the volume thereof is next decreasing, and thereafter connecting said second heat exchanger outlet to said chamber when the volume thereof is next decreasing, said fluid remaining in the liquid state throughout the system.

2. A refrigeration system comprising a pair of elements movable relative to each other co-operating to define a chamber the volume of which is alternately increased and decreased by relative movement, a first heat exchanger having an inlet and an outlet, a second heat exchanger having an inlet and an outlet; valve means sequentially connecting said chamber to said first heat exchanger inlet when the volume of said chamber is reducing, connecting said first heat exchanger outlet to said chamber when the volume thereof is increasing, connecting said second heat exchanger inlet to said chamber when the volume thereof is next decreasing, and thereafter connecting said second heat exchanger outlet to said chamber when the volume thereof is next decreasing, a compressible liquid completely filling said chamber and said heat exchangers, said first heat exchanger being filled with compressed liquid and operating to cool the liquid while compressed and said second heat exchanger being filled with uncompressed liquid and operating to add heat thereto.

3. A hydraulic refrigeration system comprising means operable to compress a fluid supplied thereto by adding work energy to the fluid and expand the compressed fluid supplied thereto by removing work energy therefrom, a first heat exchanger connected to said means operable to cool fluid compressed thereby and return the cooled compressed fluid to said means, said means operating to expand the cooled compressed fluid removing work energy therefrom, and a second heat exchanger connected to said means operable to add heat to expanded fluid from said means and return the heated fluid to said means for compression thereby, said fluid remaining in the liquid state throughout the system.

4. An operating cycle for a hydraulic refrigeration mechanism including a piston and cylinder consisting of a compression stroke during which a liquid supplied thereto is compressed while in the liquid state in said cylinder and thereafter transferred to a cooler, an expansion stroke during which the compressed and cooled liquid in the liquid state is supplied to said cylinder and expanded, an exhaust stroke during which the expanded cooled liquid in the liquid state is expelled from said cylinder and heated, and an intake stroke during which the heated liquid in the liquid state is returned to said cylinder.

5. An operating cycle for a hydraulic refrigeration system including a cylinder and a co-operating piston, and first and second heat exchangers all of which are completely filled with a compressible liquid, consisting of an intake stroke during which liquid state fluid is supplied to said cylinder from said first heat exchanger, a compression stroke during which liquid state fluid is compressed into said second heat exchanger to be cooled, an expansion stroke during which compressed and cooled liquid state fluid from said second heat exchanger is supplied to said cylinder and expanded, and an exhaust stroke during which cooled and expanded liquid state fluid is expelled from said cylinder into said first heat exchanger to be heated thereby.

6. A refrigeration mechanism comprising a cylinder, a piston movable in said cylinder co-operating therewith to define a chamber the volume of which is changed by piston movement, a cooler, a heater, liquid completely filling said chamber, heater, and cooler; and valve means operable to sequentially connect said chamber to said heater when said piston is moving in a direction increasing the volume of said chamber, thereafter connecting said chamber to said cooler when said piston is moving in a direction decreasing the volume of said chamber and compressing the liquid contained therein, thereafter connecting said chamber to said cooler to expand cool liquid therefrom in said chamber as the piston is moving in a direction increasing the volume thereof, and thereafter connecting said chamber to said heater when the piston is moving in a direction decreasing the volume of said chamber.

7. A refrigeration mechanism comprising a pump including movable elements co-operating to define a chamber the volume of which is changed by relative movement between said elements, a movable member operable to store kenetic energy by virtue of its movement connected to said elements, a cooler, a heater, a compressible liquid completely filling said heater, cooler, and chamber, valved means connecting said chamber to said heater and cooler operable to sequentially connect said cooler to said chamber when said elements are moving in a direction reducing the volume of said chamebr and compressing liquid into said cooler, said movable member supplying at least a portion of the mechanical energy of compression to said elements, said valved means operating to connect said cooler to said chamber when said elements are moving in a direction increasing the volume of said chamber expanding said liquid and removing at least a portion of the energy of compression therefrom and storing such removed energy in said movable member, said valved means thereafter connecting said chamber to said heater when said elements are moving in a direction reducing the volume of said chamber and operating to displace the cooled expanded liquid into said heater, said heater operating to add heat to the liquid contained therein, said valved means connecting said heater to said chamber when said elements are moving in a direction increasing the volume of said chamber supplying heated liquid to said chamber for subsequent compression therein.

8. A refrigeration system adapted to operate with a refrigerant maintained in the liquid state comprising, a compressor, means for delivering refrigerant to said compressor, means for operating the compressor to compress the liquid refrigerant to increase the pressure of the refrigerant and producing an increase of the temperature of the refrigerant, means for removing heat from the compressed refrigerant to reduce the temperature of the compressed refrigerant, means for returning compressed refrigerant to said compressor for expansion of the refrigerant to a lower pressure in the compressor and producing a further reduction of the temperature of the refrigerant, heat exchanging means of substantial capacity, and means for circulating said refrigerant after the expansion thereof which produces said further reduced temperature through said heat exchanging means for the reception of heat by said expanded refrigerant.

9. A refrigeration system adapted to operate with a refrigerant maintained in the liquid state comprising, a working element, means for delivering compressed refrigerant to said working element for expansion of said compressed refrigerant against the working element to supply work to the working element and producing a reduction of the temperature of the refrigerant, heat exchanging means of substantial capacity and means for circulating said refrigerant after the expansion thereof which produces the reduced temperature through said heat exchanging means for the reception of heat by the expanded refrigerant.

10. A refrigeration system adapted to operate with a refrigerant maintained in the liquid state comprising, a compressor having a contractable and expansible chamber and a working element in said chamber, means for delivering liquid refrigerant to said chamber, means for supplying work to said working element to operate the working element for compressing the liquid refrigerant in said chamber during contraction of the chamber and producing an increase of the pressure and temperature of the refrigerant, means for removing heat from the compressed refrigerant to reduce the temperature of the compressed refrigerant, means for returning compressed refrigerant at reduced temperature to said chamber for expansion of the refrigerant in the chamber against the working element during expansion of the chamber to return at least a portion of the work of compression to the working element and producing a lower pressure of the refrigerant and further reducing the temperature of the refrigerant in the chamber, heat exchanging means of substantial capacity and means for circulating said expanded refrigerant by operation of the working element after the expansion of the refrigerant in the chamber which produces the further reduced temperature through said heat exchanging means for the reception of heat by the expanded refrigerant.

11. The method of producing refrigeration in a system having a contractable and expansible chamber including a working element, and using a refrigerant having an initial temperature and pressure and maintained in the liquid state during each step of the method comprising, the step of applying work to the working element in said chamber during contraction of the chamber to compress the refrigerant to a high pressure greater than said initial pressure and producing an increase of the temperature of the refrigerant to a high temperature greater than said initial temperature, the step of cooling the compressed refrigerant to a temperature less than said high temperature, the step of expanding the compressed refrigerant against the working element in the chamber during expansion of the chamber to return at least a portion of the work of compression to the working element and producing a reduction of the pressure of the refrigerant to a low pressure less than said high pressure and producing a reduction of the temperature of the refrigerant to a low temperature less than said initial temperature, and the step of circulating said refrigerant by operation of the working element after the expansion of the refrigerant which produces the reduced temperature thereof for the reception of heat by the expanded refrigerant.

12. The method of producing refrigeration using a refrigerant maintained in the liquid state during each step of the method comprising, the step of expanding compressed refrigerant against a working element in an expansible chamber to supply work to the working element by said expansion and producing a reduction of the temperature of the refrigerant in the expansible chamber, and the step of circulating said refrigerant by operation of the working element after the expansion of the refrigerant which produces the reduced temperature thereof through heat exchanging means of substantial capacity for the reception of heat by the expanded refrigerant.

13. The method of producing refrigeration in a system using a refrigerant having an initial temperature and pressure and maintained in the liquid state during each step of the method comprising, the step of applying work to the system to compress the refrigerant to a high pressure greater than said initial pressure and producing an increase of the temperature of the refrigerant to a high temperature greater than said initial temperature, the step of cooling the compressed refrigerant to a temperature less than said high temperature, the step of expanding the compressed refrigerant and returning to the system at least a portion of the work of compression and producing a reduction of the pressure of the refrigerant to a low pressure less than said high pressure and producing a reduction of the temperature of the refrigerant to a low temperature less than said initial temperature, and the step of circulating the refrigerant after the expansion of the refrigerant to said low pressure and concomitant low temperature for the reception of heat by the refrigerant.

14. The method of producing refrigeration using a refrigerant having an initial temperature and pressure and maintained in the liquid state during each step of the method comprising, the step of compressing the refrigerant to a high pressure greater than said initial pressure and producing an increase of the temperature of the refrigerant to a high temperature greater than said initial temperature, the step of cooling the compressed refrigerant to a temperature less than said high temperature, the step of expanding the compressed refrigerant to a low pressure less than said high pressure and producing a reduction of the temperature of the refrigerant to a low temperature less than said initial temperature, and the step of circulating the refrigerant after the expansion of the refrigerant to said low pressure and concomitant low temperature for the reception of heat by the refrigerant.

15. The method of producing refrigeration using a refrigerant maintained in the liquid state during each step of the method comprising, the step of expanding compressed refrigerant against a working element to supply work to the working element by said expansion and producing a reduction of the temperature of the refrigerant, and the step of circulating said refrigerant after the expansion of the refrigerant which produces the reduced temperature thereof through heat exchanging means of substantial capacity for the reception of heat by the expanded refrigerant.

16. A method of refrigeration including the steps of compressing a liquid from a first pressure and temperature to a higher pressure and a second temperature higher than said first temperature and substantially reducing the volume of the liquid, cooling the liquid while maintaining it compressed, reducing its temperature to a third temperature lower than said first temperature by expanding it to a substantially increased volume, and thereafter absorbing heat into the decompressed liquid.

17. A hydraulic refrigerating system comprising means operating to supply mechanical energy to a liquid and compress it, a heat exchanger, a first conduit conveying compressed liquid from said means to said heat exchanger wherein heat energy is removed from the compressed liquid, a second conduit for returning said liquid from said heat exchanger to said means, said means also operating to provide for expansion of the compressed liquid thereby removing therefrom at least a portion of the energy derived from the mechanical work of compression to return the liquid to its initial pressure, a second heat exchanger, a third conduit conveying said expanded liquid from said means to said second heat exchanger wherein heat is added thereto returning the liquid to its initial temperature, and a fourth conduit for return of said liquid from said second heat exchanger to said means, said liquid remaining in the liquid state in all portions of the system.

(References on following page)

References Cited in the file of this patent

UNITED STATES PATENTS

| | | |
|---|---|---|
| 1,419,844 | Guy | June 13, 1922 |
| 1,560,705 | Mayer | Nov. 10, 1925 |
| 1,584,382 | Leblanc | May 11, 1926 |
| 1,990,052 | Sosa | Feb. 5, 1935 |
| 2,212,503 | Nickell | Aug. 27, 1940 |
| 2,481,469 | Brown | Sept. 6, 1949 |
| 2,785,540 | Biehm | Mar. 19, 1957 |

FOREIGN PATENTS

| | | |
|---|---|---|
| 210,540 | Great Britain | Feb. 4, 1924 |